US 7,848,744 B2

(12) United States Patent
Eason et al.

(10) Patent No.: US 7,848,744 B2
(45) Date of Patent: *Dec. 7, 2010

(54) ELECTRONIC COMMUNICATIONS DEVICE STATUS DETERMINATION

(75) Inventors: Wendy Eason, Decatur, GA (US); Robert Koch, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 270 days.

This patent is subject to a terminal disclaimer.

(21) Appl. No.: 12/131,342

(22) Filed: Jun. 2, 2008

(65) Prior Publication Data

US 2008/0233926 A1    Sep. 25, 2008

Related U.S. Application Data

(63) Continuation of application No. 10/600,987, filed on Jun. 20, 2003, now Pat. No. 7,383,055.

(51) Int. Cl.
*H04Q 7/20* (2006.01)
(52) U.S. Cl. .................................. 455/423; 455/424
(58) Field of Classification Search ............. 455/518, 455/422, 517, 519, 435.1, 432.1
See application file for complete search history.

(56) References Cited

U.S. PATENT DOCUMENTS

| | | | |
|---|---|---|---|
| 6,512,930 B2 | 1/2003 | Sandegren | |
| 6,856,804 B1 | 2/2005 | Ciotta | |
| 2002/0085687 A1* | 7/2002 | Contractor et al. | 379/76 |
| 2003/0036392 A1* | 2/2003 | Yukie | 455/461 |
| 2003/0050090 A1* | 3/2003 | Raffel et al. | 455/552 |
| 2004/0176076 A1* | 9/2004 | Uppuluri | 455/414.1 |
| 2006/0148420 A1 | 7/2006 | Wonak et al. | |

* cited by examiner

*Primary Examiner*—Creighton Smith
(74) *Attorney, Agent, or Firm*—Moazzam & Associates, LLC

(57) ABSTRACT

Methods and systems are provided for alerting a calling or message sending party as to whether a desired receiving wireless electronic communication device is off or out of range for sending and receiving transmissions. When a call is placed to a wireless telephone or when a message or page is placed to a wireless communication device such as a pager, text messaging device, or personal digital assistant, the operational status of the receiving wireless telephone or other wireless communication device is checked by the wireless network in which the wireless device operates. A message or call is returned to the calling party or sender to alert the calling party or sender if the desired receiving device is off or out of range so that the calling party or message sending party may choose an alternate means of communicating with the desired receiving party.

39 Claims, 3 Drawing Sheets

ELECTRONIC COMMUNICATIONS DEVICE STATUS DETERMINATION

CROSS-REFERENCE TO RELATED APPLICATIONS

The present application is a continuation of U.S. patent application Ser. No. 10/600,987, filed on Jun. 20, 2003 now U.S. Pat. No. 7,383,055, and entitled "Electronic Communications Device Status Determination," which is hereby incorporated by reference.

FIELD OF THE INVENTION

The present invention relates to methods and systems for reporting the status of an electronic communications device to a call or message sender.

BACKGROUND OF THE INVENTION

With the advent of wireless electronic communications devices such as wireless telephones, pagers, instant text messaging systems, and other wireless personal digital assistants, call or message senders have grown accustomed to reaching a user of such wireless devices at any time and at any place. Typically, when a message or call is placed to such wireless devices, some indication is received by the sender as to the status of the call or message. For example, a page or instant message sent to a wireless device may cause the sender to receive an indication the message was delivered or read. A call to a wireless telephone may be answered by a called party or by a voice mail system.

Unfortunately, such systems do not alert the sender or caller when the receiving wireless device is off or out of the transmission range of the receiving device. If a pager or other wireless messaging device is off or out of range, the sender typically receives a return message that the message or page was delivered, but not read. Such a message may indicate to the sender that the receiving party received the message, but simply has not yet read the message. A call placed to a wireless telephone that is off or out of range typically results in the call being answered by a voice mail system. As far as the calling party is concerned, the called party may simply be engaged in a current telephone conversation resulting in the call being transferred to the voice mail system. Unfortunately, in either situation, if it is urgent that the caller or sender reach the user of the wireless device, the caller or sender has no way of knowing that some alternate method of reaching the receiving party must be used owing to the fact that the receiving device is either off or is out of range.

Accordingly, there is a need for a method and system for alerting a calling or message sending party as to whether a receiving wireless device is off or out of range. It is with respect to these and other considerations that the present invention has been made.

SUMMARY OF THE INVENTION

Embodiments of the present invention solve the above and other problems by providing methods and systems for alerting a calling or message sending party as to whether a receiving wireless device is off or out of range. According to one aspect of the present invention, when a user of a wireless electronic communications device, such as a wireless telephone, pager, instant messaging device, or wireless personal digital assistant, switches the wireless device to an on position, a signal is sent by the device to its operating network to register the device as being on and in range to send and receive calls or messages. Periodically, the operating network signals or "pings" the wireless device to confirm its operational status. If the wireless device is switched off, or if the wireless device is moved by the user out of the transmission range of the operating network or any affiliated operating networks, the operating network registers the condition of the device as off or out of range. The current status of the wireless device may be maintained by the operating network in a status database. Alternatively, each time a call or message is sent to a given wireless device, the operating network for the device may check the status of the device prior to attempting delivery of a message or call to the device.

If the device is on or in range, the call or message is transmitted to the device, and the sender does not receive any indication that the called device has not received the call or message. If the called device is off or out of range, a message is returned to the caller or sender to indicate that the receiving device is off or out of range. The return message may be in the form of a tone or recorded message to a wireless telephone, or the message may be in the form of a text message to a pager or other instant messaging device. According to one aspect, the operating network for the receiving device may send an additional message to the caller or sender to alert the caller or sender when the receiving device is switched on or is back in range for sending and receiving messages.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
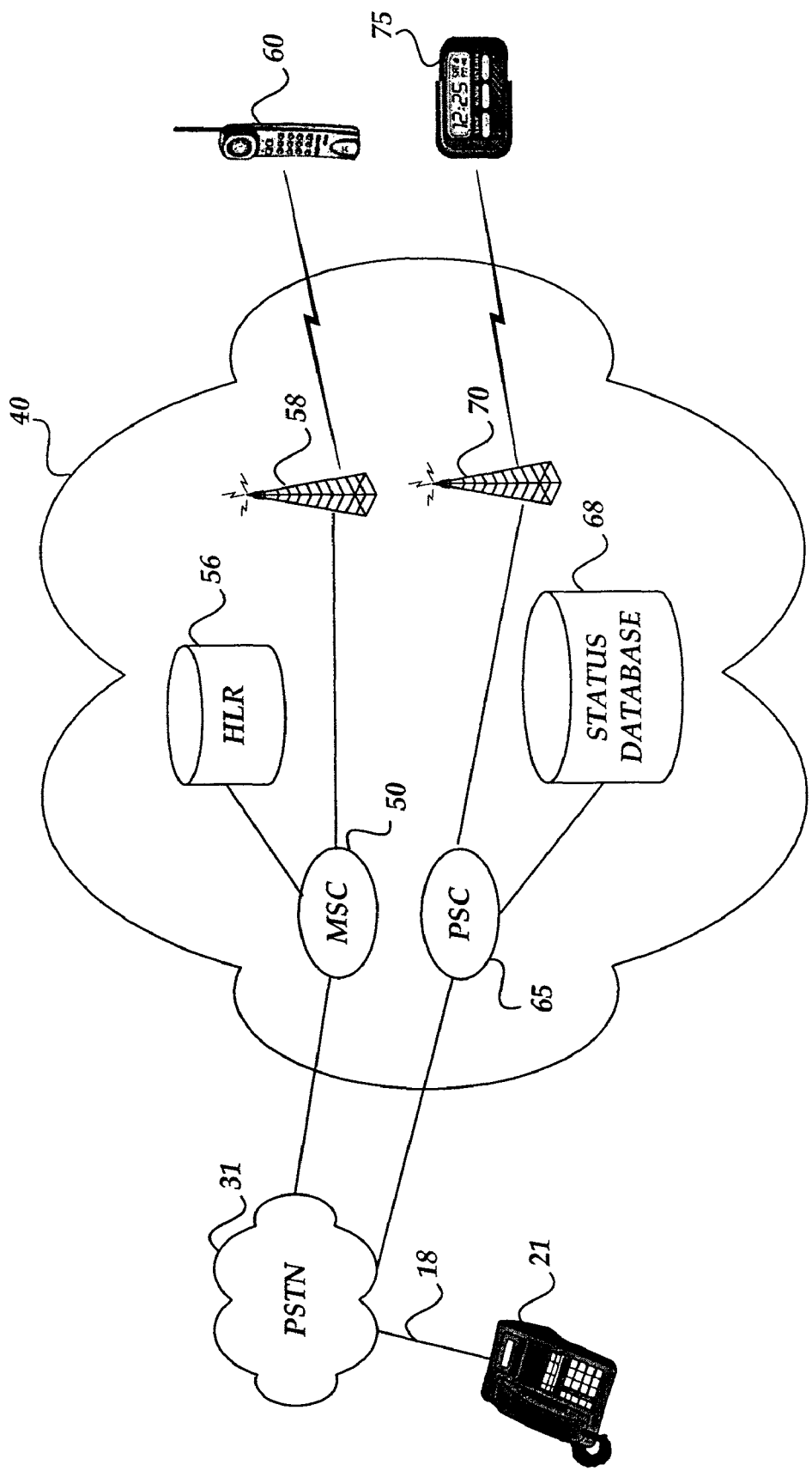
FIG. 1 is a simplified block diagram illustrating components of a wireline and wireless communications network that provides an exemplary operating environment for the present invention.

As briefly described above, embodiments of the present invention provide methods and systems for alerting a calling or message sending party as to the operational status of a receiving wireless electronic communications device. The embodiments of the present invention described herein may be combined, other embodiments may be utilized, and structural changes may be made without departing from the spirit and scope of the present invention. The following detailed description is, therefore, not to be taken in a limited sense, and the scope of the present invention is defined by the pending claims and their equivalents. Referring now to the drawings, in which like numerals refer to like components or elements throughout the several figures, aspects of the present invention will be described.

FIG. 1 is a simplified block diagram illustrating components of a wireline and wireless communications network that provides an exemplary operating environment for the present invention. A wireline telephone 21 is shown connected to a public switched telephone network 31. The public switched telephone network 31 generally refers to a worldwide voice telephone network accessible via wirelines 21 and accessible from wireless networks 40 via wireless telephones 60 and other wireless electronic communications devices such as the pager or instant messaging device or personal digital assistant 75 (hereafter PDA).

The wireless network 40, such as a cellular telecommunications network, paging network, or instant messaging network, may comprise a number of wireless network components such as a mobile switching center 50 responsible for receiving and routing calls to and from the wireless telephone 60 and a PSC 65 responsible for receiving and routing calls to and from other wireless electronics devices such as the PDA 75. A pair of antennas 58, 70 is illustrated for transmitting signaling, messages, and calls to and from wireless electronic communications devices 60, 75.

A home location register (HLR) 56 is illustrated in FIG. 1 and is responsible for, among other things, maintaining the current operational status of wireless electronic devices such as the wireless telephone 60. As is known to those skilled in the art, when the wireless telephone 60 is switched to an on position, a signal is transmitted from the wireless telephone 60 to an antenna 58 in whose range the wireless telephone 60 is operating. Signaling via the antenna 58 is transmitted to the network operating the wireless telephone 60 via the mobile switching center 50. The status of the wireless telephone 60 is then registered with the HLR 56 to include the entry node (antenna 58) through which the wireless telephone 60 is communicating with the network 40 and the on/off status and the in/out of range status of the wireless telephone 60. That is, once the wireless telephone 60 transmits signaling via an entry node, such as the antenna 58, the HLR 56 may log the status of the wireless telephone 60 as being on and in range for sending and receiving calls. If the wireless telephone 60 is moved out of the range of the antenna 58 into the range of a different antenna or entry node, additional signaling may alert the network and the HLR 56 that the wireless telephone 60 is still on and is still in range for sending and receiving messages.

Periodically, signaling is transmitted to the wireless telephone 60 in the form of a "ping" to check the status of the wireless telephone 60. If the wireless telephone 60 returns signaling to the network that is received by the network, the status of the wireless telephone 60 is updated, if necessary, to include changes in the entry node or antenna through which the wireless telephone 60 is communicating with the network. On the other hand, if the wireless telephone 60 is switched to the off position, or if the wireless telephone 60 does not respond to signaling from the network, the registration status of the wireless telephone 60 is changed at the HLR 56 to indicate that the wireless telephone 60 is off or is out of range. As is known to those skilled in the art, the wireless telephone 60 may be turned to an off position, but the wireless telephone 60 may still be able to respond to queries from the network. In such a case, the network may register the wireless telephone 60 as being in an off position, but in range to send and receive transmissions. According to embodiments of the present invention, when a call or message is sent to the wireless telephone 60 from a calling or message sending party, the operational status of the wireless telephone 60 may be utilized by the network to return a message to the calling or sending party to alert the calling or sending party that the wireless telephone 60 is off or is out of range for call or message receipt.

Referring still to FIG. 1, the status database 68 represents a database for maintaining operational status information on other wireless electronic devices such as the PDA 75. It should be understood by those skilled in the art that the status database 68 may be operated with or separately from the HLR 56. That is, the status database 68 is representative of a system for maintaining operational status and information on other wireless electronic devices such as the PDA 75. As described above for the wireless telephone 60, the PDA 75 may signal its operating wireless network via an entry node such as the antenna 70 through the switching center 65 so that the operational status of the PDA 75 may be logged at the status database 68.

As with the wireless telephone 60, periodically signaling may be sent to the wireless PDA 75 to confirm the operational status of the PDA 75. If no response is received by the wireless network 40 under which the wireless PDA 75 operates, a status of off or out of range may be logged in the status database 68 for the wireless PDA 75. As is understood by those skilled in the art, the wireless PDA 75 may be configured to respond to "pings" from the network 40 even if the wireless PDA is in an off position. Accordingly, a status for the wireless PDA 75 may be registered as off, on and in range, out of range, or off and in range. According to an embodiment of the present invention, if a caller or message sender transmits a message to the wireless PDA 75, a message may be returned to the caller or sender to indicate the operational status of the wireless PDA 75 to alert the caller or sender if the wireless PDA is off or is out of range so that the caller or sender may choose an alternate means of communicating with the called party if it is urgent that the caller or sender immediately communicate with the called party.

Figure 2:
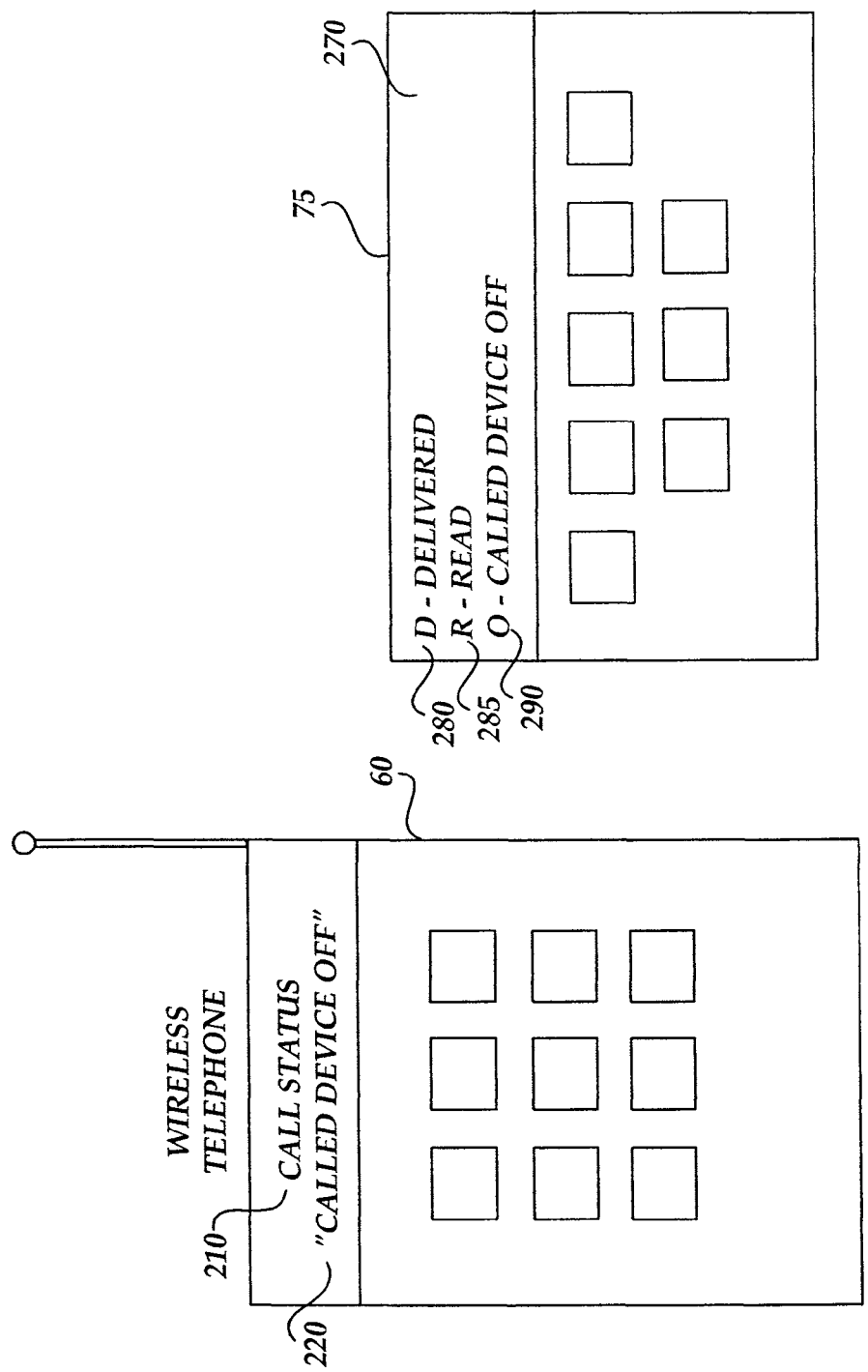
FIG. 2 illustrates a wireless telephone and a wireless pager or instant messaging device showing operational status messages according to an embodiment of the present invention.

FIG. 2 illustrates a wireless telephone and a wireless pager or instant messaging device showing operational status messages according to an embodiment of the present invention. The wireless telephone 60 is shown having a screen 210 where a variety of information such as caller identification information, presently dialed telephone directory numbers, battery status, and the like may be presented to the user. According to an embodiment of the present invention, a call status message 220 may be provided to the calling party to alert the calling party as to the status of a wireless telephone or instant messaging device to which a call or message is directed from the wireless telephone 60. As illustrated in FIG. 2, if the wireless electronic communication device to which a call or message is directed is in an off position, a message such as "called device off" may be presented to the calling party to alert the calling party that she must use an alternate means of communications to reach the called party. Alternatively, a tone such as a series of beeps, or a prerecorded message may be transmitted to the wireless telephone 60 to alert the calling party that the receiving device is off or out of range at the present time. As should be understood by those skilled in the art, the wireless telephone 60 is for example only, and similar information may be provided to a caller at a wireline telephone 21, illustrated in FIG. 1, where call status information 200 may be provided in a caller identification screen of the wireline telephone 21. Alternatively, a tone or prerecorded message may be played to a calling party via the wireline telephone 21 to provide operational status of a called receiving device.

The PDA 75, shown in FIG. 2, is illustrative of a pager, instant messaging device, or other personal digital assistant capable of sending and receiving wireless communications. A message screen 270 is provided where the user may compose, edit, and review text messages or text renderings of voice messages or pages. Operational status indicators 280, 285, 290 are illustrated for providing a message sender operational status information of a wireless electronic device to which the sender has transmitted a message. For example, a message such as "delivered" may be presented which may indicate nothing more than the delivery of a message to a network through which a receiving device operates. A message such as "read" may be presented indicating that the a sent message has been read. On the other hand, a message such as "called device off" may be presented to the sender to indicate that the receiving device is switched to an off position. Other messages may be presented to the sender such as "called device out of range" to provide the message sending party information as to the status of the receiving device.

Figure 3:
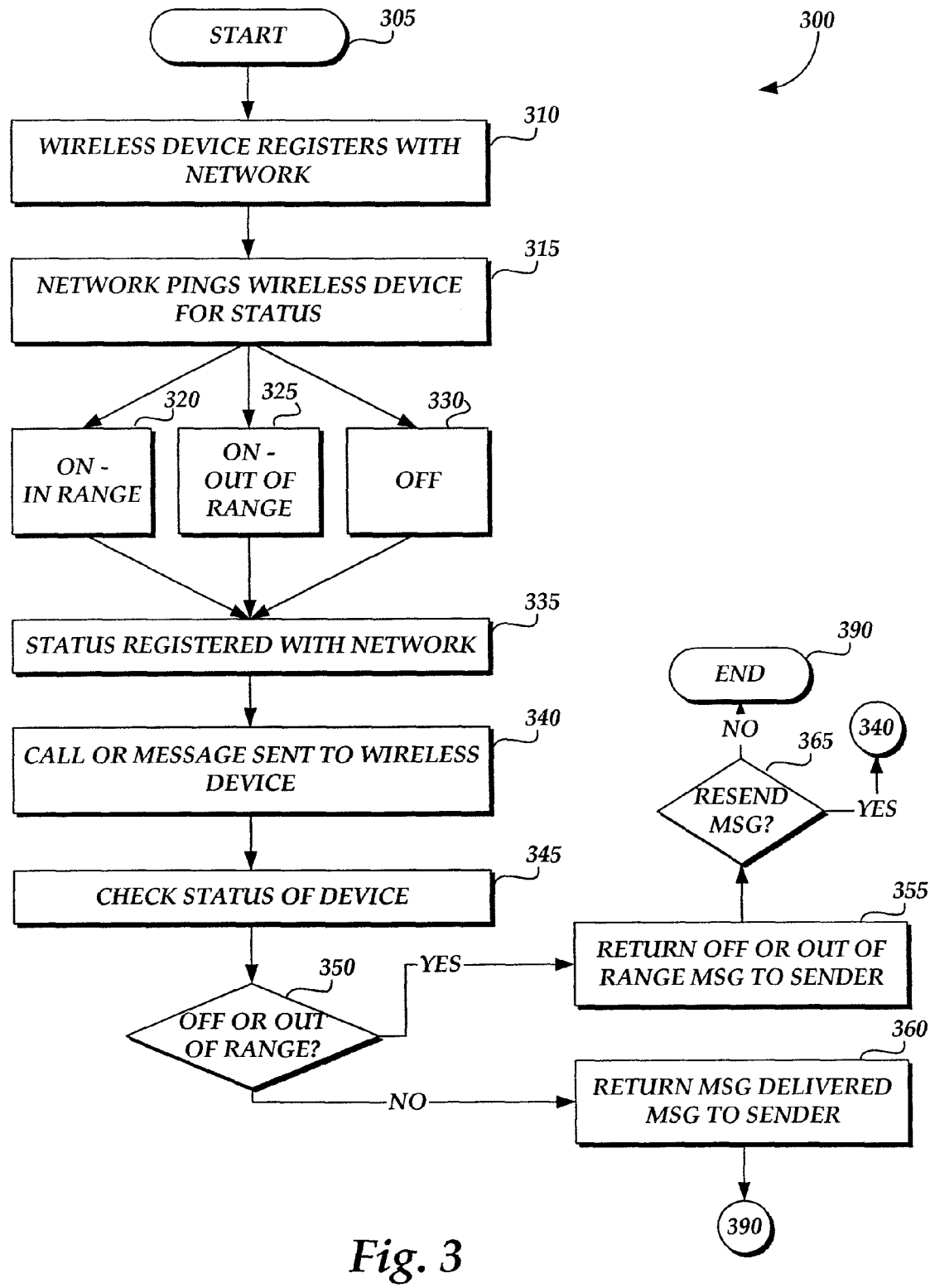
FIG. 3 illustrates a logical flow of the steps performed by a method and system of the present invention for tracking the status of a receiving wireless electronic communications device and for alerting a calling or sending party of the operational status of a receiving wireless electronic communications device.

FIG. 3 illustrates a logical flow of the steps performed by a method and system of the present invention for tracking the status of a receiving wireless electronic communications device and for alerting a calling or sending party of the operational status of a receiving wireless electronic communications device. The method 300 begins at start step 305 and proceeds to step 310 where a wireless device 60, 75 registers with the wireless network 40 through which the wireless device operates. As described with reference to FIG. 1, the wireless telephone 60 or wireless PDA 75 sends a signal to its operating network upon being switched to an on position and upon being brought within the range of a network entry node such as the antennas 58, 70. Once the wireless network 40 receives signaling from the wireless electronic device 60, 75 an indication of the operational status of the device is logged at the HLR 56 or the status database 68, as described above.

At step 315, once the wireless device is registered with the wireless network 40, the network periodically pings (signals) the wireless electronic device 60, 75 to determine the current operational status of the device. As described above, if a responsive signal is received by the network 40 from the wireless electronic device indicating that the device is on and in range for sending and receiving transmissions, the method proceeds to step 320, and a status of on and in range is logged for the device. If the device is on, but has been moved out of range, the method to proceeds to step 325, and that status is logged for the device. If the device is in range, but has been switched to an off position, or if no response is received from the device, the method proceeds to step 330 and a status of off or off and out of range may be logged for the wireless device. At step 335, the status of the wireless device is registered with the wireless network 40, as described above with reference to FIG. 1.

At step 340, a call or message sender attempts to send a call to the wireless telephone 60 or a page or text message to the PDA 75. As should be understood by those skilled in the art, the call placed to the wireless telephone 60 may come from another wireless telephone 60 or from a wireline telephone 21 via the public switch telephone network 31 through the wireless network 40. A page to the PDA 75 may be come from a wireline telephone 21 or a wireless telephone 60. A text page or text message may be transmitted to the wireless PDA 75 from another wireless PDA 75 or from a wire line computer (not shown). At step 345, when the call or message is received by the wireless network 40, prior to completing the call or message to the wireless device 60, 75, the wireless network 40 checks the status of the receiving device. In the case of the wireless telephone 60, the operational status of the wireless telephone 60 may be checked at the HLR 56. In the case of the PDA 75, the operational status may be checked at the status database 68, or at the HLR 56, depending on where operational status information is maintained for the PDA 75 by the network 40. As should be understood by those skilled in the art, the current operational status for the wireless devices 60, 75 maintained in the HLR 56 or status database 68 may be utilized to determine whether a return message should be sent to the sender to indicate that the receiving device is not on or in range. Alternatively, the wireless network 40 may signal the wireless electronic device 60, 75 each time a message or call is received by the network 40 for the wireless device 60, 75 to determine the operational status of the wireless device 60, 75.

At step 350, a determination is made as to whether the receiving wireless electronic device is off or out of range. If the wireless electronic device is on and is in range for sending a receiving calls and messages, the method proceeds to step 360, and a message is returned to the caller or sender that the message or call was delivered. Alternatively, no message may be returned to the caller or sender, and the call or message may be processed to the receiving device without further status indication to the sender or caller. That is, if a call is placed to a wireless telephone 60, the call may be answered by the receiving party, or the call may be forwarded to a voice mail system for the receiving party. If a message is sent to a wireless PDA 75, and the device is on and in range, a message may be returned to the sender indicating that the message has been delivered and read, or no message may be returned to the sender.

Referring back to step 350, if the status of the receiving wireless electronic device is off, out of range, on and out of range, or unknown, the method proceeds to step 355, and a message is returned to the calling party or message sender, as described above with reference to FIG. 2. For example, if the wireless telephone 60 is off, a message may be displayed in the screen 210 of the telephone 60 indicating that the wireless telephone is off. Alternatively, a prerecorded message may be returned to the calling party to indicate that the receiving wireless telephone 60 is off, out of range, or is otherwise not capable of receiving the call from the calling party. If a text message or page is sent to a wireless PDA 75, a message may be returned to the sender indicating that the device is off, out of range, or is otherwise not capable of receiving messages at the present time. At step 365, a determination is made as to whether the calling party or message sender resends the call or message to the desired receiving device 60, 75. If not, the method ends at step 390. If the calling party or message sender desires to resend the call or message, the method proceeds back to step 340, and a second call or message is sent to the wireless device.

According to an alternative embodiment of the present invention, if the wireless network 40 returns a message to the calling party or sender, at step 355, indicating that the receiving device is off, out of range, or otherwise not capable of receiving the transmission, the wireless network 40 may send a second message to the calling party or message sender if the status of the wireless electronic device changes. That is, if the wireless electronic device 60, 75 to which the call or message is directed is turned to the on position or is brought in range for sending and receiving transmissions, the wireless network 40 may place a call to a calling party or may send a message to a message sending party to alert the calling party or message sender that the desired receiving device is now capable of receiving the desired call or message.

As described herein, methods and systems are providing for alerting a calling party or message sending party as to whether a desired receiving wireless electronic communication device is off or out of range so that the calling party or message sender may choose an alternate means for communicating with the call or message receiving party, if necessary. It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method of alerting a communications sender of the status of a receiving wireless electronic device, comprising:
   receiving a transmission at a wireless network directed to the receiving wireless electronic device, the transmission comprising at least one of a telephone call and a data message from the communications sender directed to a party associated with the receiving wireless electronic device;
   determining the operational status of the receiving wireless electronic device; and
   if the receiving wireless electronic device is not capable of receiving and processing the transmission directed to the receiving wireless electronic device, returning a signal to a sending communication device from which the transmission is emitted to alert a user of the sending communication device that the receiving wireless electronic device is not capable of receiving and processing the transmission.

2. The method of claim 1, whereby determining the operational status of the receiving wireless electronic device includes querying a status database at the wireless network for the operational status of the receiving wireless electronic device.

3. The method of claim 2, whereby querying a status database for the operational status of the receiving wireless electronic device includes querying a home location register for the operational status of the receiving wireless electronic device.

4. The method of claim 1, whereby returning a signal to the sending communication device includes returning a signal indicating that the receiving wireless electronic device is off.

5. The method of claim 1, whereby returning a signal to the sending communication device includes returning a signal to the sending communication device that the receiving wireless electronic device is out of transmission range.

6. The method of claim 1, whereby returning a signal to the sending communication device includes returning a signal to the sending communication device that the receiving wireless electronic device is on and out of transmission range.

7. The method of claim 1, further comprising displaying an alert at the sending communication device that the receiving wireless electronic device is not capable of receiving and processing the transmission from the sending communication device to the receiving wireless electronic device.

8. The method of claim 1, further comprising playing an audio tone at the sending communication device to alert a user of the sending communication device that the receiving wireless electronic device is not capable of receiving and processing the transmission.

9. The method of claim 1, further comprising playing a prerecorded message at the sending communication device to alert a user of the sending communication device that the receiving wireless electronic device is not capable of receiving and processing the transmission.

10. The method of claim 1, prior to receiving a transmission at the wireless network directed to the receiving wireless electronic device, registering the operational status of the receiving wireless electronic device with the wireless network.

11. The method of claim 10, whereby registering the operational status of the receiving wireless electronic device with the wireless network includes signaling the wireless network from the receiving wireless electronic device to provide the operational status for the receiving wireless electronic device.

12. The method of claim 11, whereby signaling the wireless network from the receiving wireless electronic device includes signaling the wireless network to notify the wireless network as to whether the receiving wireless electronic device is on, in range, off, or on and out of range.

13. The method of claim 12, further comprising logging the operational status of the receiving wireless electronic device at the wireless network.

14. The method of claim 13, whereby logging the operational status of the receiving wireless electronic device includes logging the operational status of the receiving wireless electronic device at a status database at the wireless network.

15. The method of claim 14, whereby logging the operational status at a status database includes logging the operational status at a home location register at the wireless network.

16. The method of claim 1, prior to receiving a transmission at the wireless network directed to the receiving wireless electronic device including signaling the receiving wireless electronic device from the wireless network to determine the operational status of the receiving wireless electronic device.

17. The method of claim 1, whereby the receiving wireless electronic device is a wireless telephone.

18. The method of claim 1, whereby the receiving wireless electronic device is a wireless pager.

19. The method of claim 1, whereby the receiving wireless electronic device is an instant text messaging device.

20. A system for alerting a communications sender of the status of a receiving wireless electronic device, comprising:
   a wireless network operative to receive a transmission directed to the receiving wireless electronic device;
   to determine the operational status of the receiving wireless electronic device, wherein determining the operational status of the receiving wireless electronic device comprises periodically signaling the wireless electronic device; and
   to return a signal to a sending communication device from which the transmission is emitted to alert a user of the sending communication device that the receiving wireless electronic device is not capable of receiving and processing the transmission, if the receiving wireless electronic device is not capable of receiving and processing the transmission directed to the receiving wireless electronic device.

21. The system of claim 20, whereby the wireless network is further operative to query a status database at the wireless network for the operational status of the receiving wireless electronic device to determine the operational status of the receiving wireless electronic device includes.

22. The system of claim 21, whereby the wireless network is further operative to query a home location register for the operational status of the receiving wireless electronic device.

23. The system of claim 20, whereby the wireless network is further operative to return a signal to the sending communication device that the receiving wireless electronic device is off, is out of transmission range, or is on and out of transmission range.

24. The system of claim 20, whereby the sending communication device is operative to display an alert in response to signaling from the wireless network that the receiving wireless electronic device is not capable of receiving and processing the transmission from the sending communication device to the receiving wireless electronic device.

25. The system of claim 20, whereby the sending communication device is operative to play an audio tone in response to signaling from the wireless network to alert a user of the sending communication device that the receiving wireless electronic device is not capable of receiving and processing the transmission.

26. The system of claim 20, whereby the sending communication device is operative to play a prerecorded message in response to signaling from the wireless network to alert a user of the sending communication device that the receiving wireless electronic device is not capable of receiving and processing the transmission.

27. The system of claim 20, whereby the wireless network is further operative prior to receiving a transmission directed to the receiving wireless electronic device, to register the operational status of the receiving wireless electronic device in response to signaling from the receiving wireless electronic device.

28. The system of claim 20, whereby the wireless network is further operative prior to receiving a transmission directed to the receiving wireless electronic device to signal the receiving wireless electronic device to determine the operational status of the receiving wireless electronic device.

29. The system of claim 20, whereby the receiving wireless electronic device is a wireless telephone.

30. The system of claim 20, whereby the receiving wireless electronic device is a wireless pager.

31. The system of claim 20, whereby the receiving wireless electronic device is an instant text messaging device.

32. A method of alerting a communications sender of the status of a receiving wireless electronic device, comprising:
   receiving a transmission at a wireless network directed to the receiving wireless electronic device;
   signaling the receiving wireless electronic device from the wireless network to determine the operational status of the receiving wireless electronic device, wherein determining the operational status of the receiving wireless electronic device comprises periodically signaling the wireless electronic device;
   registering the operational status of the receiving wireless electronic device with the wireless network; and
   if the receiving wireless electronic device is off or out of transmission range, returning a signal to a sending communication device from which the transmission is emitted to alert a user of the sending communication device that the receiving wireless electronic device is not capable of receiving and processing the transmission.

33. The method of claim 32, further comprising displaying an alert at the sending communication device that the receiving wireless electronic device is not capable of receiving and processing the transmission from the sending communication device to the receiving wireless electronic device.

34. The method of claim 32, further comprising playing an audio tone at the sending communication device to alert a user of the sending communication device that the receiving wireless electronic device is not capable of receiving and processing the transmission.

35. The method of claim 32, further comprising playing a prerecorded message at the sending communication device to alert a user of the sending communication device that the receiving wireless electronic device is not capable of receiving and processing the transmission.

36. The method of claim 32, whereby registering the operational status of the receiving wireless electronic device with the wireless network includes signaling the wireless network from the receiving wireless electronic device to notify the wireless network as to whether the receiving wireless electronic device is on, off, out of transmission range, or on and out of transmission range.

37. The method of claim 32, whereby the receiving wireless electronic device is a wireless telephone.

38. The method of claim 32, whereby the receiving wireless electronic device is a wireless pager.

39. The method of claim 32, whereby the receiving wireless electronic device is an instant text messaging device.

\* \* \* \* \*